United States Patent
Zhu et al.

(10) Patent No.: US 12,146,618 B2
(45) Date of Patent: *Nov. 19, 2024

(54) SYSTEM AND METHOD FOR DETERMINING RANGE OF POSSIBLE LOCATIONS OF PIPELINE LEAK

(71) Applicant: SPL Leak Detection LLC, Hobe Sound, FL (US)

(72) Inventors: Junxiao Zhu, Houston, TX (US); John M Spruth, Houston, TX (US)

(73) Assignee: SPL Leak Detection LLC, Hobe Sound, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 17/587,776

(22) Filed: Jan. 28, 2022

(65) Prior Publication Data
US 2022/0146054 A1    May 12, 2022

Related U.S. Application Data

(63) Continuation of application No. 16/927,505, filed on Jul. 13, 2020, now Pat. No. 11,274,797.

(51) Int. Cl.
*F17D 5/06* (2006.01)
*G01M 3/18* (2006.01)
(Continued)

(52) U.S. Cl.
CPC .............. *F17D 5/06* (2013.01); *G01M 3/183* (2013.01); *G01M 3/243* (2013.01); *G06F 17/18* (2013.01); *H04W 4/38* (2018.02)

(58) Field of Classification Search
CPC ......... F17D 5/06; G01M 3/183; G01M 3/243; G01M 3/2815; G06F 17/18; H04W 4/38
See application file for complete search history.

(56) References Cited

U.S. PATENT DOCUMENTS 9,470,601 B1    10/2016    Chaudhary et al.
11,274,797 B1 *  3/2022    Zhu ..................... G01M 3/2815
(Continued)

OTHER PUBLICATIONS

Ziganshin, Technique for search of pipeline leadage according to Acoustic signal analysis (Year: 2017).*
(Continued)

*Primary Examiner* — John E Breene
*Assistant Examiner* — Dacthang P Ngo
(74) *Attorney, Agent, or Firm* — The Law Offices of Konrad Sherinian, LLC; Depeng Bi

(57) ABSTRACT

A pipeline leak detection and location range determination system includes a set of monitoring devices installed at ends of segments of a pipeline, and server computer system communicating with the set of monitoring devices over the Internet. The server computer system is also adapted to communicate with client computer systems over the Internet. Each monitoring device within the set includes a set of sensors for reading time-varying signals, including pressure, of the pipeline, and communicates the time-varying signals and corresponding timestamps to the server computer system. The server computer system analyzes such data using regression to derive a range of possible locations of a leak in the pipeline. A probability distribution corresponding to subranges within the range is also determined. The server computer system communicates the range and probability distribution to client computer systems for being presented to pipeline maintenance professionals.

7 Claims, 10 Drawing Sheets

(51) Int. Cl.
    *G01M 3/24*           (2006.01)
    *G06F 17/18*         (2006.01)
    *H04W 4/38*         (2018.01)

(56) References Cited

U.S. PATENT DOCUMENTS

| | | |
|---|---|---|
| 2002/0124633 A1 | 9/2002 | Yang |
| 2014/0142870 A1 | 5/2014 | Duan |
| 2015/0350752 A1 | 12/2015 | Solomon |
| 2017/0219454 A1 | 8/2017 | Chaudhary et al. |
| 2017/0323039 A1* | 11/2017 | Kumar .................. G06F 17/18 |
| 2019/0137353 A1* | 5/2019 | Cole ..................... H04B 17/21 |

OTHER PUBLICATIONS

Adedeji, Towards Achieving a reliable leakage detection and localization algorithm for application in water piping network (Year: 2017).*

An innovative method for automatic determination of time of arrival for Lamb waves excited by impact events, Junxiao Zhu et al., Smart Materials and Structures, vol. 26, Issue 5, Apr. 13, 2017, IOP Publishing.

Bernoulli's principle, Wikipedia, https://en.wikipedia.org/wiki/Bernoulli%27s_principle.

Wavelet Transform, Chapter 4. Data Processing and Analysis, http://gwyddion.net/documentation/user-guide-en/wavelet-transform.html, Gwyddion user guide, Petr Klapetek, David Nečas, Christopher Anderson.

\* cited by examiner

| Range low | Range high | Number | Probability=Number/Total | Mean Range | Cumulative |
|---|---|---|---|---|---|
| 22.98273683 | 23.02178385 | 1 | 0.0001 | 23.00226034 | 0.01% |
| 23.02178385 | 23.06083087 | 2 | 0.0002 | 23.04130736 | 0.03% |
| 23.06083087 | 23.0998779 | 11 | 0.0011 | 23.08035438 | 0.14% |
| 23.0998779 | 23.13892492 | 34 | 0.0034 | 23.11940141 | 0.48% |
| 23.13892492 | 23.17797194 | 88 | 0.0088 | 23.15844843 | 1.36% |
| 23.17797194 | 23.21701896 | 181 | 0.0181 | 23.19749545 | 3.17% |
| 23.21701896 | 23.25606599 | 456 | 0.0456 | 23.23654247 | 7.73% |
| 23.25606599 | 23.29511301 | 724 | 0.0724 | 23.2755895 | 14.97% |
| 23.29511301 | 23.33416003 | 1051 | 0.1051 | 23.31463652 | 25.48% |
| 23.33416003 | 23.37320705 | 1353 | 0.1353 | 23.35368354 | 39.01% |
| 23.37320705 | 23.41225408 | 1588 | 0.1588 | 23.39273056 | 54.89% |
| 23.41225408 | 23.4513011 | 1478 | 0.1478 | 23.43177759 | 69.67% |
| 23.4513011 | 23.49034812 | 1186 | 0.1186 | 23.47082461 | 81.53% |
| 23.49034812 | 23.52939514 | 825 | 0.0825 | 23.50987163 | 89.78% |
| 23.52939514 | 23.56844217 | 531 | 0.0531 | 23.54891866 | 95.09% |
| 23.56844217 | 23.60748919 | 290 | 0.029 | 23.58796568 | 97.99% |
| 23.60748919 | 23.64653621 | 132 | 0.0132 | 23.6270127 | 99.31% |
| 23.64653621 | 23.68558323 | 46 | 0.0046 | 23.66605972 | 99.77% |
| 23.68558323 | 23.72463026 | 16 | 0.0016 | 23.70510675 | 99.93% |
| 23.72463026 | 23.76367728 | 7 | 0.0007 | 23.74415377 | 100.00% |

Figure 10

SYSTEM AND METHOD FOR DETERMINING RANGE OF POSSIBLE LOCATIONS OF PIPELINE LEAK

CROSS REFERENCE TO RELATED APPLICATIONS

This application is a continuation of U.S. patent application Ser. No. 16/927,505; entitled "SYSTEM AND METHOD FOR DETERMINING RANGE OF POSSIBLE LOCATIONS OF PIPELINE. LEAK", filed Jul. 13, 2020 and issued as U.S. Pat. No. 11,274,797 on Mar. 15, 2022, which is hereby incorporated by reference in its entirety and claims the benefit and priority of U.S. Provisional Patent Application No. 62/875,677, entitled "SYSTEM AND METHOD FOR DETERMINING RANGE OF POSSIBLE LOCATIONS OF PIPELINE LEAK", filed July. 18, 2019.

FIELD OF THE DISCLOSURE

The present invention generally relates to liquid or gas transportation pipelines, and more particularly relates to a system and method for determining a range of possible locations of a leak in a pipeline. More particularly still, the present disclosure relates to a system and method for determining a range of possible locations of a leak in a pipeline with corresponding probabilities.

DESCRIPTION OF BACKGROUND

Pipelines are used to transport materials, such as gas, oil and water. A pipeline includes a plurality of connected pipe segments. Valves are oftentimes deployed along a pipeline to manage the flow of the materials running through the pipeline. Damage to a pipe segment, can cause a leak, which may be very detrimental to the environment, surrounding properties, and human beings since the flowing mass can be flammable or toxic. A leak also leads to significant economic loss.

To improve the transmission efficiency, compressor stations are oftentimes deployed along a pipeline. The compressor/pump stations pressurize the liquid (such as oil, water, liquid chemicals, etc.) or gas materials (collectively referred to herein as flowing materials) to increase the flow. The increased pressure imparts considerable kinetic energy to the moving mass within the pipeline. With even a small leak in the pipeline, the high pressure would make the leak significantly more detrimental to the environment, surrounding properties, and human beings. The high pressure would also cause significantly more economic loss.

The transmission pipelines are usually buried underground and exposed to corrosion by water and other materials. When installed above the ground, the pipelines are still exposed to the risk of damages by the natural events, human activities, corrosion by rainwater and moisture, and other factors. Pipelines are thus coated with external insulation. However, the insulation layer sometimes is compromised for various reasons. A breach to the insulation layer exposes a metal pipe segment to metallic corrosion. In addition, pipe segments are also gradually weakened by internal corrosion from active electrolytes in the flowing mass.

It is desirable to reduce the impact of any leak by prompt detection of the leak, determine the characteristics of the leak, such as the time of the leak, the location of the leak, etc. Certain methods have been proposed for detecting pipeline leaks. However, the conventional methods are not desirable for different reasons. For example, they rely upon pressure differential tests using Supervisory Control and Data Acquisition ("SCADA") or Highway Addressable Remote Transducer ("HART") industrial communication protocol-based pressure and velocity monitors that provide limited data obtained at slow time intervals. Though the conventional method provides a limited solution to situations with slowly changing pressure, they are not adequate to process, or even detect faster transient pressure waves generated by abrupt leaks to pipelines. Typically, the pressure drop due to a leak lasts less than 0.1 second. A data acquisition system with a sampling rate less than 60 Hz, or 60 samples per second, would not provide sufficient information to characterize the changing pressure.

The conventional methods can also rely on wavelet transformation. These conventional methods endeavored to identify a specific location of the leak. However, due to inaccuracy in the signal detection and the leak location estimation methods, the identified leak location is oftentimes not accurate. The wrong localization of the leak in a pipeline further delays any remedies to the leak.

A prompt and accurate determination of the location of the actual leak is thus highly desirable. Accordingly, there is a need for new and improved system and method for detecting remote pipeline leaks. It is desirable for the system and method to identify a range of possible locations of the leak and associate a probability with each subrange within the range. In addition, the new system and method needs to capture pipeline pressure data at high sampling rate to detect leaks in pipelines with fast changing pressure. Dynamic and static leak detection methods are further desired. The new system and the new methods are also desired to detect leaks on other types of metallic structures.

Objects of the Disclosed System, Method, and Apparatus

Accordingly, an objective of this disclosure is to provide a new system and method for detecting a leak in remote pipelines.

Another object of this disclosure is to provide a new system and a new method for localizing a leak in a remote pipeline by identifying a range of possible locations of the leak.

Another object of this disclosure is to provide a new system and a new method for localizing a leak in a remote pipeline by identifying a range of possible locations of the leak and assigning a probability for each subrange of locations within the range.

Another object of this disclosure is to provide a new system and a new method for detecting fault conditions in remote pipelines.

Another object of this disclosure is to provide a system and a method for detecting remote pipeline leaks by capturing pressure data at rates in excess of one-hundred (100) samples per second.

Another object of this disclosure is to provide a system and a method for detecting remote pipeline leaks by capturing pressure data at rates in excess of three-hundred (300) samples per second.

Another object of this disclosure is to provide a system and a method for detecting remote pipeline leaks by deriving the static and dynamic waveforms from the turbulent flow patterns within pipelines.

Another object of this disclosure is to provide a system and a method for detecting remote pipeline leaks by acquiring additional time stamped data from multiple valve openings and closures along a pipeline in addition to changes in data due to changes in compressor/pump output and flow data.

Another object of this disclosure is to provide a system and a method for detecting remote pipeline leaks by establishing normal operation patterns to form a baseline normal status of operation.

Another object of this disclosure is to provide a system and a method for protecting pipelines by determining aberrations in a normal flow pattern and transmitting it to a central station for alerting various parties and systems.

Another object of this disclosure is to provide a system and a method for detecting remote pipeline leaks by pressurizing a segment of pipeline between two valve stations with an incompressible fluid to localizing a leak based on pressure monitored at the valve stations.

Other advantages of this disclosure will be clear to a person of ordinary skill in the art. It should be understood, however, that a system, an apparatus or a method could practice the disclosure while not achieving all of the enumerated advantages, and that the protected disclosure is defined by the claims.

SUMMARY OF THE DISCLOSURE

Generally speaking, pursuant to the various embodiments, the present disclosure provides a method of determining a pipeline leak and the leak location range. The method is performed within a server computer system and includes receiving a first set of field data points from a first monitoring device within a set of monitoring devices. Each field data point within the first set of field data points includes a timestamp and a corresponding time-varying signal. The time-varying signal is a value of the parameter. The server computer system includes a server computer processing unit, some amount of memory operatively coupled to the server computer processing unit, a networking interface operatively coupled to the server computer processing unit for receiving field data from a set of monitoring devices, and a server software application. Each monitoring device within the set of monitoring devices is installed at a joint between two consecutive pipeline segments of a pipeline. The pipeline has a set of pipeline segments. Each monitoring device within the set of monitoring device includes a microprocessor; a set of sensors operatively coupled to the microprocessor, each sensor within the set of sensors adapted to detect a parameter of a flowing material within the pipeline; a wireless network interface operatively coupled to the microprocessor for communicating with the server computer system; some amount of memory operatively coupled to the microprocessor; and a time receiver operatively coupled to the microprocessor. The method further includes receiving a second set of field data points from a second monitoring device within the set of monitoring devices, each field data point within the second set of field data points includes a timestamp and a corresponding time-varying signal; analyzing the first set of field data points and the second set of field data points to determine that a leak has occurred to a first pipeline segment corresponding to the first monitoring device and the second monitoring device; and determining a probability distribution corresponding to a set of subranges of a range of possible leak locations. Moreover, the method of claim 1 includes determining a set of regression functions; estimating a first set of arrival times from the set of regression functions by applying the set of regression functions to the first set of field data points; estimating a second set of arrival times from the set of regression functions by applying the set of regression functions to the second set of field data points; combining the first set of arrival times and the second set of arrival times to form a set of arrival time pairs; applying a leak location determination equation to each arrival time pair within the set of arrival time pairs to derive an estimated leak location, thereby forming a set of estimated leak locations; and superimposing the set of estimated leak locations to derive the probability distribution corresponding to the set of subranges of possible leak locations. The parameter is a pressure parameter, a temperature parameter or a velocity parameter. The pressure parameter is a negative pressure wave parameter. The leak location determination equation is an equation of $X_{leak}=(L+v^*(t_2-t_1))/2$ where $X_{leak}$ refers to a leak location, L stands for the full length of a segment within the set of pipeline segments, v stands for the sound velocity, $t_2$ refers to the timestamp when the negative pressure wave of a leak is detected by the second monitoring device, and t1 refers to the timestamp when the negative pressure wave of the leak was detected by the first monitoring device. The server software application performs a regression analysis to derive the probability distribution using a regression model:

$$Y \approx f(X, \beta)$$

where Y represents multiple time-varying signals, X represents timestamps of time-varying signals, and $\beta$ represents a finite number of unknown parameters of the regression function $f$ that are estimated from data points. The set of regression functions are Ramp functions:

$$y(x) \approx \begin{cases} \beta_1, & x < \beta_3 \\ -\beta_2(x - \beta_3) + \beta_1, & x \geq \beta_3 \end{cases}$$

where y(x) represents time-varying pressure signals, x represents timestamps and $\beta=[\beta_1, \beta_2, \beta_3]$, $\beta_1$ represents time-varying pressure signal without a leak, $-\beta_2$ represents the time-varying pressure signal decreasing rate when a leak occurs, $\beta_3$ represents the arrival-time of the negative pressure wave when a leak occurs.

Further in accordance with the present teachings is a leak detection and determination system. The leak detection system includes a set of monitoring devices installed on segments of a pipeline. The monitoring devices each include a set of sensors for reading time-varying signals of the pipeline. The signals can be pressure, temperature, velocity, etc. The monitoring devices each further include a microprocessor and a wireless network interface or a wired network interface for sending the collected field data (including the time-varying signals and corresponding timestamps) to a server computer system of the leak determination system over a wide area network, such as the Internet. The server computer system includes a processing unit, a memory operatively coupled to the processing unit, a networking interface operatively coupled to the processing unit, an operating system running on the processing unit, and a specialized server software application running on the operating system.

The specialized server software application retrieves and analyzes the field data using regression analysis to determine that a leak at a particular pipeline segment has occurred. The regression analysis derives a range of possible leak locations by estimating the arrival times of the negative pressure wave (NPW) to the monitoring devices installed at opposite ends of each pipeline segment. The specialized server software application further determines a probability distribution corresponding to subranges of the range of possible leak locations. The specialized server software application provides the range of possible leak locations and the probability distribution to client computer system for notifying a pipeline maintenance crew.

BRIEF DESCRIPTION OF THE DRAWINGS

Although the characteristic features of this disclosure will be particularly pointed out in the claims, the invention itself, and the manner in which it may be made and used, may be better understood by referring to the following description taken in connection with the accompanying drawings forming a part hereof, wherein like reference numerals refer to like parts throughout the several views and in which:

FIG. 10 is an illustrative probability distribution table in accordance with this disclosure.

A person of ordinary skills in the art will appreciate that elements of the figures above are illustrated for simplicity and clarity, and are not necessarily drawn to scale. The dimensions of some elements in the figures may have been exaggerated relative to other elements to help understanding of the present teachings. Furthermore, a particular order in which certain elements, parts, components, modules, steps, actions, events and/or processes are described or illustrated may not be actually required. A person of ordinary skills in the art will appreciate that, for the purpose of simplicity and clarity of illustration, some commonly known and well-understood elements that are useful and/or necessary in a commercially feasible embodiment may not be depicted in order to provide a clear view of various embodiments in accordance with the present teachings.

DETAILED DESCRIPTION

Figure 1:
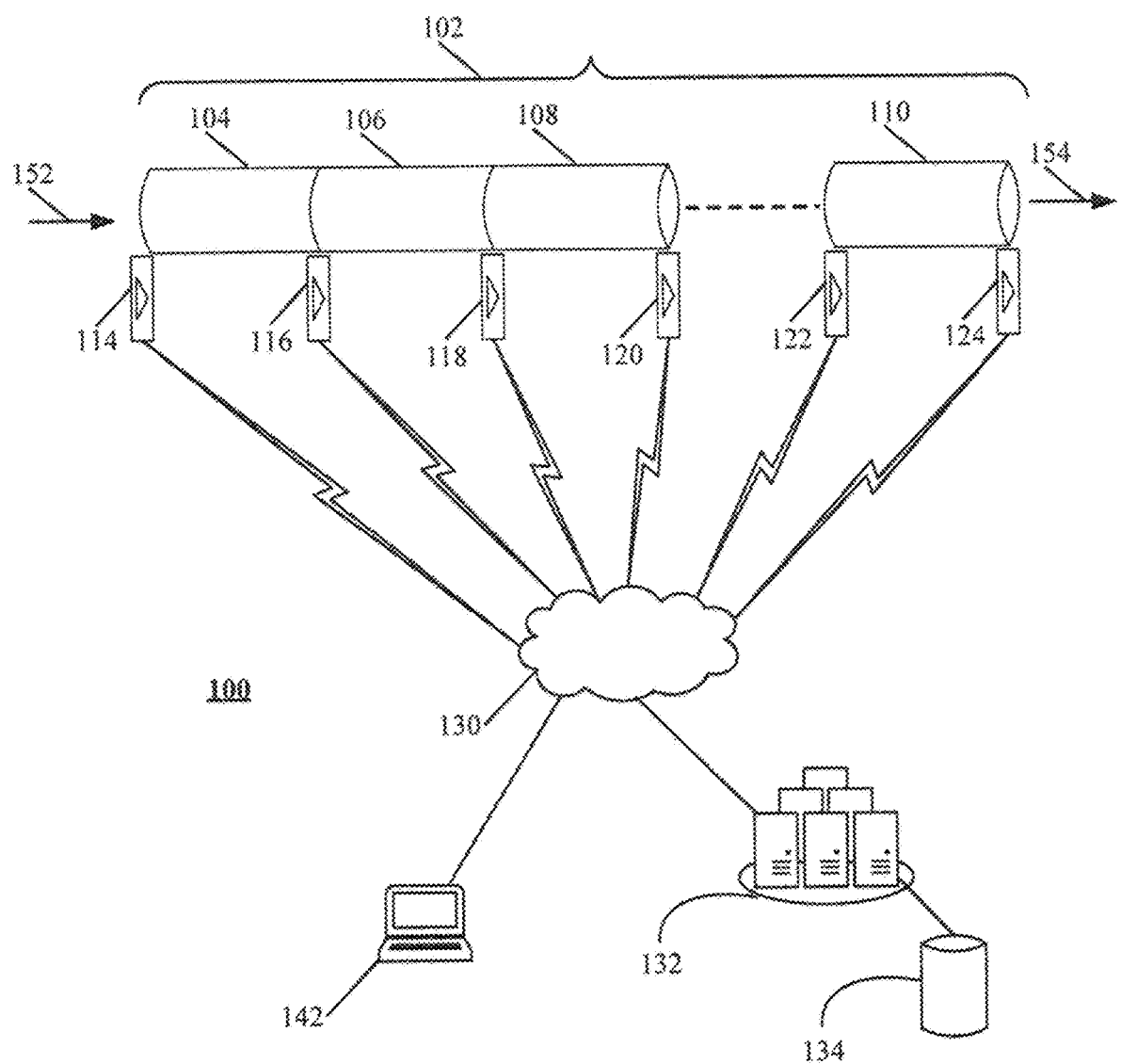
FIG. 1 is a simplified diagram illustrating a pipeline leak detection and location range determination system along with a pipeline in accordance with this disclosure.

Turning to the Figures and to FIG. 1 in particular, a pipeline leak detection and location range determination system along with a pipeline (such as a remote oil pipe line) 102 is shown and generally indicated at 100. The pipeline 102 includes a plurality of pipe segments, such as the pipeline line segments 104, 106, 108 and 110. A type of flowing materials flows inside the pipeline 102. The direction of the flow is indicated at 152 and 154. In the illustrative diagram, the left side is the upstream while the right side is the downstream.

Figure 2:
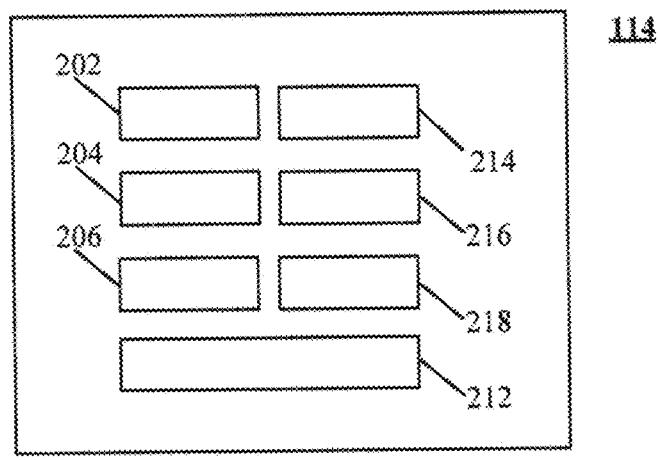
FIG. 2 is an illustrative block diagram of a monitoring device in accordance with this disclosure.

The leak detection and location range determination system 100 includes a set of monitoring devices 114, 116, 118, 120, 122 and 124 installed at the joint of each pair of neighboring pipeline segments. The monitoring devices 114-124 are further illustrated by reference to FIG. 2. Referring now to FIG. 2, an illustrative block diagram of the monitoring device 114 is shown. The monitoring device 114 includes a set (meaning one or more) of sensors indicated at 202, 204 and 206. The sensors 202-206 can detect pressure, temperature, flow velocity and other parameters of the flowing material inside the pipeline 102. The monitoring devices 114 also includes a microprocessor 212, a wireless network interface 214 operatively coupled to the microprocessor 212 for communicating with a computer system, a memory element 216 operatively coupled to the microprocessor 212, and a time receiver 218 operatively coupled to the microprocessor 212. The sensors 202-206 are also operatively coupled to the microprocessor 212.

Turning back to FIG. 1, the system 100 also includes a server computer system 132 and a database 134 operatively coupled to and accessed by the computer system 132. The computer system 132 can be, for example, a single computer or a group of computers. The group of computers can be a server computer farm or a cloud server or cloud server system. Each computer of the computer system 132 includes a processing unit, some amount of memory (such as 256 GB) operatively coupled to the processing unit, and a networking interface.

The computer system 132 stores data into the database 134 and retrieves data from the database 134. The database 134 can be a cloud database, a relational database, a local database running inside the computer system 132, a data collection residing in a memory element of the computer system 132, etc. The data can be, for example, time-varying data collected and sent by the monitoring devices 114-124.

The monitoring devices 114-124 communicate with the computer system 132 over a network 130. For example, the monitoring devices 114-124 send data that they collected to the computer system 132. The network 130 can include the Internet. In one implementation, the monitoring devices 114-124 access the Internet via a public or private cellular network. In such a case, the cellular network is deemed to be part of the Internet. The monitoring devices 114-124 can also access the Internet via wire networks or other types of wireless networks.

Figure 3:
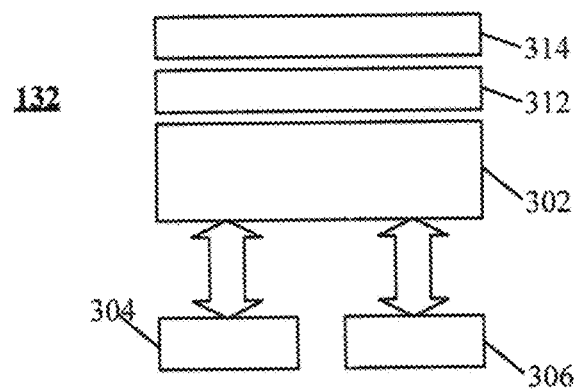
FIG. 3 is an illustrative block diagram of a server computer system in accordance with this disclosure.

The computer system 132 is further illustrated by reference to FIG. 3. Referring to FIG. 3, an illustrative block diagram of a server computer of the server computer system 132 is shown. The server computer 132 includes a processing unit 302, a memory unit 304 operatively coupled to and accessed by the processing unit 302, a network interface 306 operatively coupled to the processing unit 302, an operating system 312 running on the processing unit, a specialized server software application 314 running on the operating system 312. The specialized server software application 314 is programmed in one or more computer programming languages, such as C, C++, C#, Java, Python, etc.

Turning back to FIG. 1, the system 100 also includes a client computer system 142 (such as a desktop computer, a laptop computer, a tablet computer, a smartphone, etc.) communicating with the server system 132 via the Internet 130. The client computer system 142 includes a processing unit, a memory unit, a digital display and a network interface. The client computer system 142 also runs a client software application (such as a proprietary software application or a web browser) to communicate with the specialized server software application 314.

When a leak occurs in a pipeline segment, such as the pipeline segment 106, the flowing material inside the pipeline 102 escapes from the location of the leak in the pipeline section 106, and thus e") in the pipeline 102. The NPW travels through the pipeline at the sound velocity, which varies from 1000 to 5000 feet per second depending on the types of the flowing materials. The monitoring device 116 at the upstream end and the monitoring device 118 at the downstream end of the pipeline segment 106 then detects the pressure drop at the respective ends of the segment 106. The timing of the leak and the detection is further illustrated by reference to FIG. 4.

Figure 4:
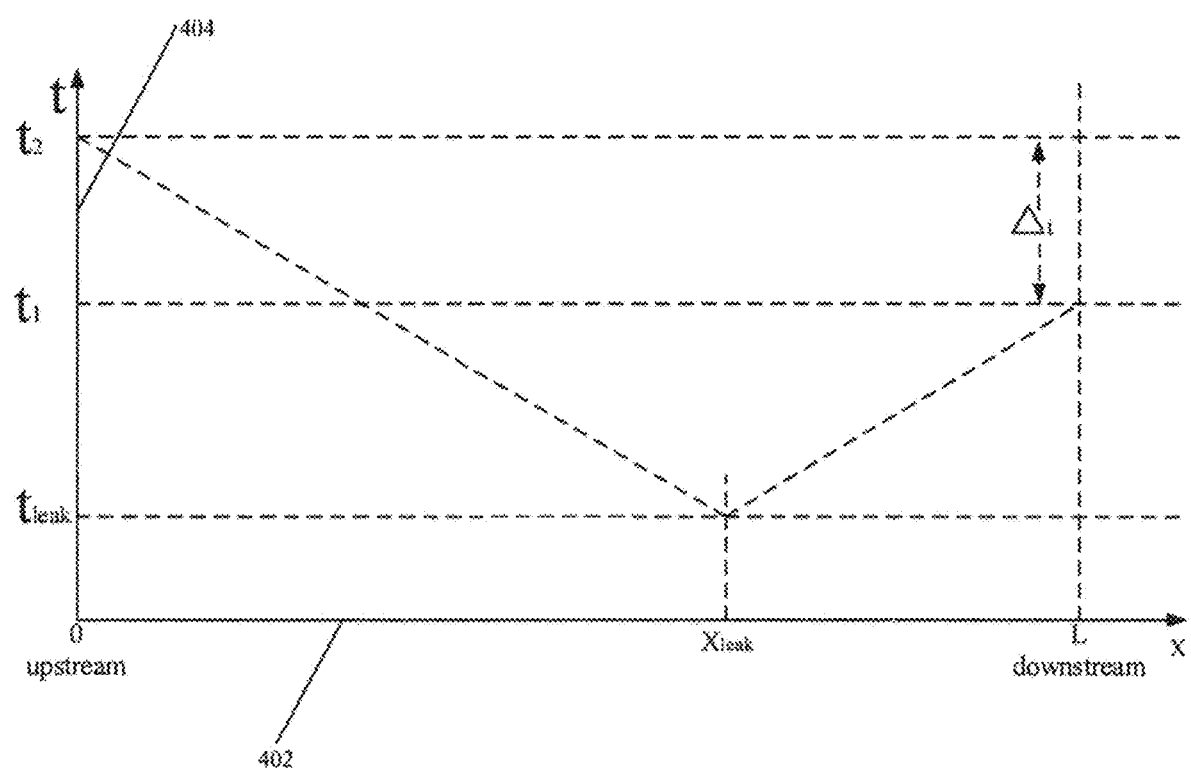
FIG. 4 is an illustrated diagram of leak time and detection time in accordance with this disclosure.

Turning to FIG. 4, an illustrated diagram of the leak time and the detection time are shown. The X-axis 402 indicates the flowing direction. At length 0, the device 116 is located. At the length L, the device 118 is installed. L indicates the full length of the segment 106. The location of the leak is indicated by $X_{leak}$. The t-axis indicating time is indicated at 404. When $X_{leak}$ is the middle point of the segment 106, the NPW should arrive at the monitoring devices 116-118 at the same time, or approximately the same time due to various factors, such as environment conditions. When $X_{leak}$ is closer to the upstream end, the NPW arrives earlier at the device 116 than the device 118. When $X_{leak}$ is closer to the downstream end, the NPW arrives earlier at the device 118 than the device 116.

FIG. 4 illustrates a leak with $X_{leak}$ closer to the device 118 than the device 116. At time $t_{leak}$, the leak occurs. At time $t_1$, the NPW arrives on the device 118. At time $t_2$, the NPW arrives on the device 116. $t_2$ is latter than $t_1$. The difference in arrival times is indicated as $\Delta t$. $\Delta t = t_2 - t_1$. For ease of illustration, the time when the NPW arrives at the location of a monitoring device is regarded as the same time when the NPW is detected by the same monitoring device. The relationship between the leak location and the timestamps $t_1$ and $t_2$ are shown in the Equation A below:

$$X_{leak} = (L + v^*(t_2 - t_1))/2$$

where v stands for the sound velocity when sound travels in the particular type of material flowing inside the pipeline 102.

Figure 5:
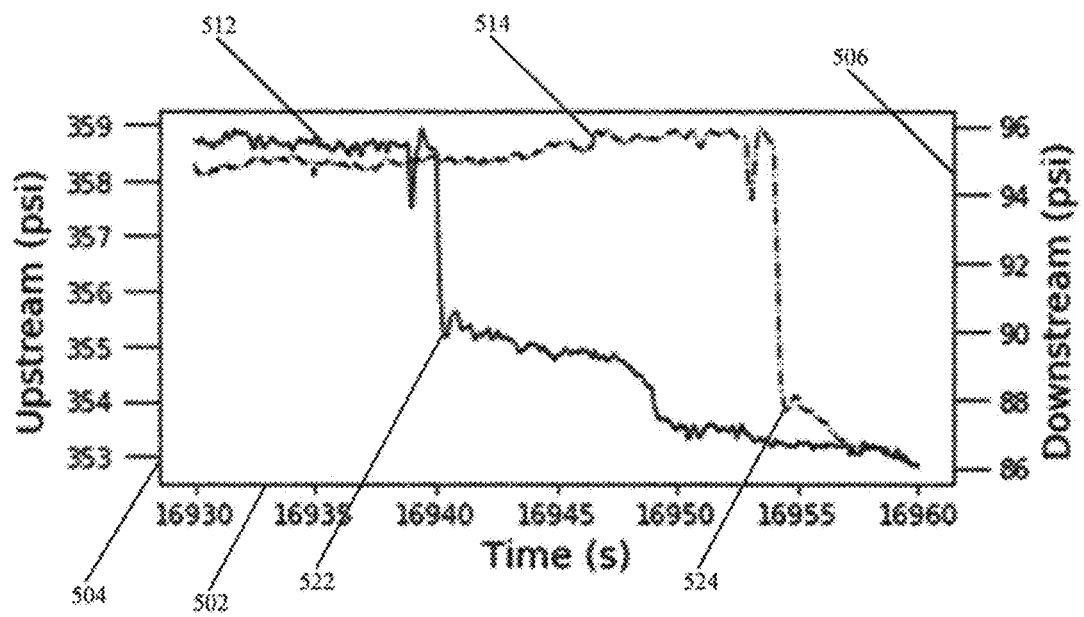
FIG. 5 is an illustrated diagram of leak time and detection time in accordance with this disclosure.

The timing of the leak and the detection is further illustrated by reference to FIG. 5. Turning to FIG. 5, an illustrated diagram of the leak time and the detection time are shown. The horizontal axis 502 indicates the direction of time. The vertical axis 504 indicates the detected pressure at the upstream end of the segment 106, while the vertical axis 506 indicates the detected pressure at the downstream end of the segment 106. The detected time-varying pressure data by the monitoring device 118 is indicated at 512, while the detected time-varying pressure data by the monitoring device 116 is indicated at 514. At about the time mark 16940, the NPW 522 is detected by the downstream monitoring device 118. At about the time mark 16955, the NPW 524 is detected by the upstream monitoring device 116.

Figure 6:
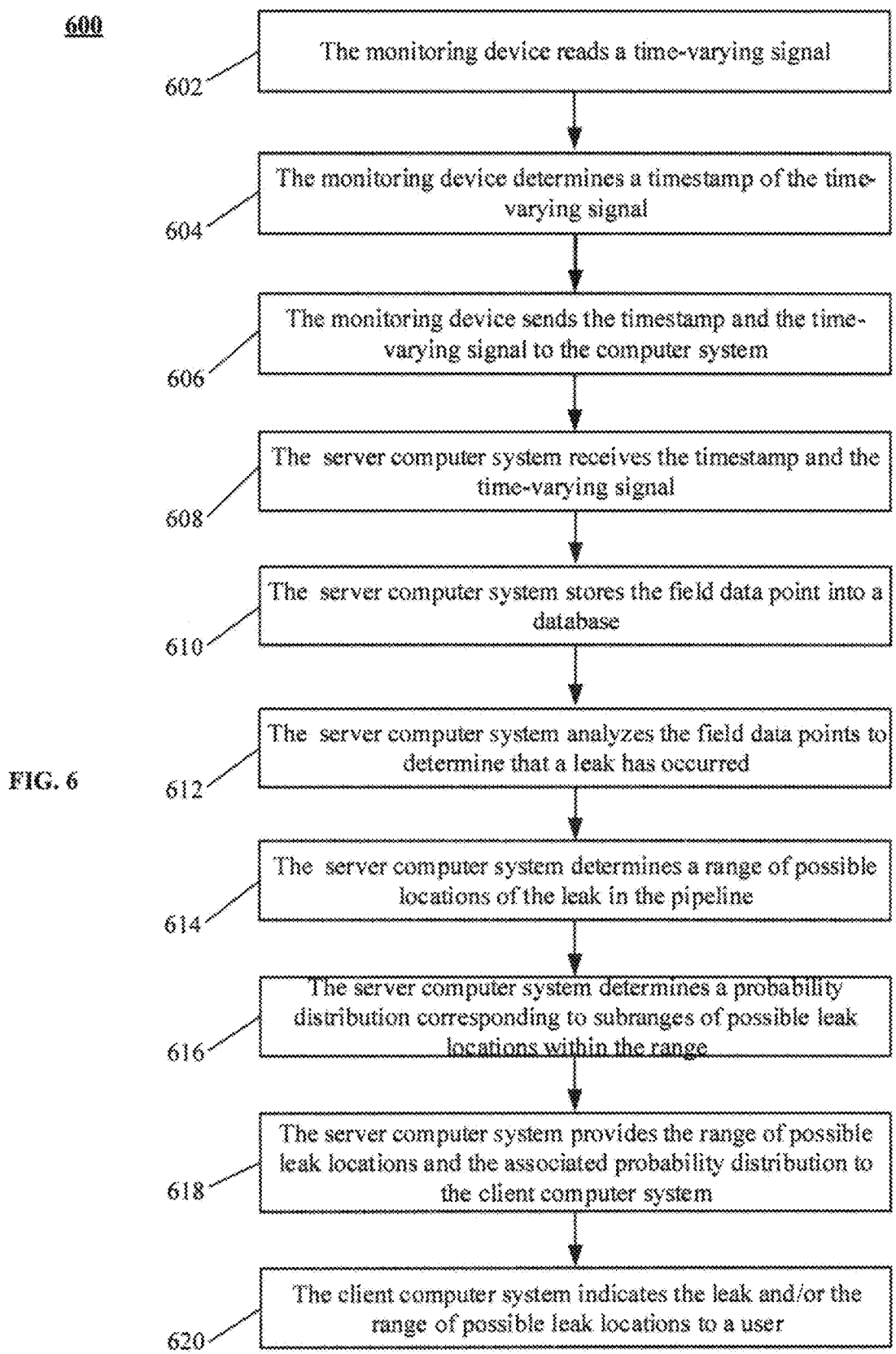
FIG. 6 is a flowchart illustrating the process by which a pipeline leak detection and location range determination system determines a leak and a range of possible leak locations of a pipeline segment in accordance with this disclosure.

Referring to FIG. 6, a flowchart illustrating the process by which the pipeline leak detection and location range determination system 100 detects time-varying signals, records a timestamp of each signal, provides these field data to the computer system 132, determine the leak, and determine a range of possible locations of the leak is shown and generally indicated at 600. At 602, a monitoring device (such as the devices 116 and 118) reads time-varying signals, such as a pressure signal, a temperature signal, etc. At 604, the monitoring device determines the time (also referred to herein as timestamp) of each time-varying signal. At 606, the monitoring device sends the timestamp and the corresponding time-varying signal (collectively referred to herein as a field data point) to the computer system 132. At 608, the server software application 314 receives the field data point. At 610, the server software application 314 stores the received field data point into the database 134. In one implementation, the field data point is written into an external database and also stored into a database residing in the memory 304 for immediate processing by the server software application 314. The server software application 314 receives field data points from each monitoring devices. A person of ordinary skill in the art will appreciate that each field data point also includes or corresponds to a unique identifier identifying the corresponding monitoring device.

At 612, the server software application 314 analyzes the field data points to determine that a leak has occurred or likely occurred in the pipeline 102. The analyzed field data points are a collection of field data points gathered by the monitoring devices 116-118. For example, from the field data points received from the monitoring devices 116-118, the server software application 314 determines pressure drops 522-524 and thus concludes that a leak has occurred in the segment 106. The location of the leak can be derived using the Equation A. In the example above, the collection of field data points includes a set of field data points from the monitoring device 116 and a set of field data points of the monitoring device 118.

At 614, the server software application 314 determines a range of possible locations of the leak in a pipeline segment. At 616, the server software application 314 further determines a probability distribution corresponding to subranges of the range of possible locations of the leak in a pipeline segment. One subrange of possible leak locations can be more likely to include the actual leak location than another subrange.

At 618, the server software application 314 provides the range of possible locations of the leak and the corresponding probability distribution to the client computer 142. At 620, the client computer system 142 indicates to a user that a leak has occurred, and/or the range of possible leak locations. The indication can be in various forms, such as audio, image, web page, text message, E-mail message, telephonic call, in-application message, etc.

Figure 7:
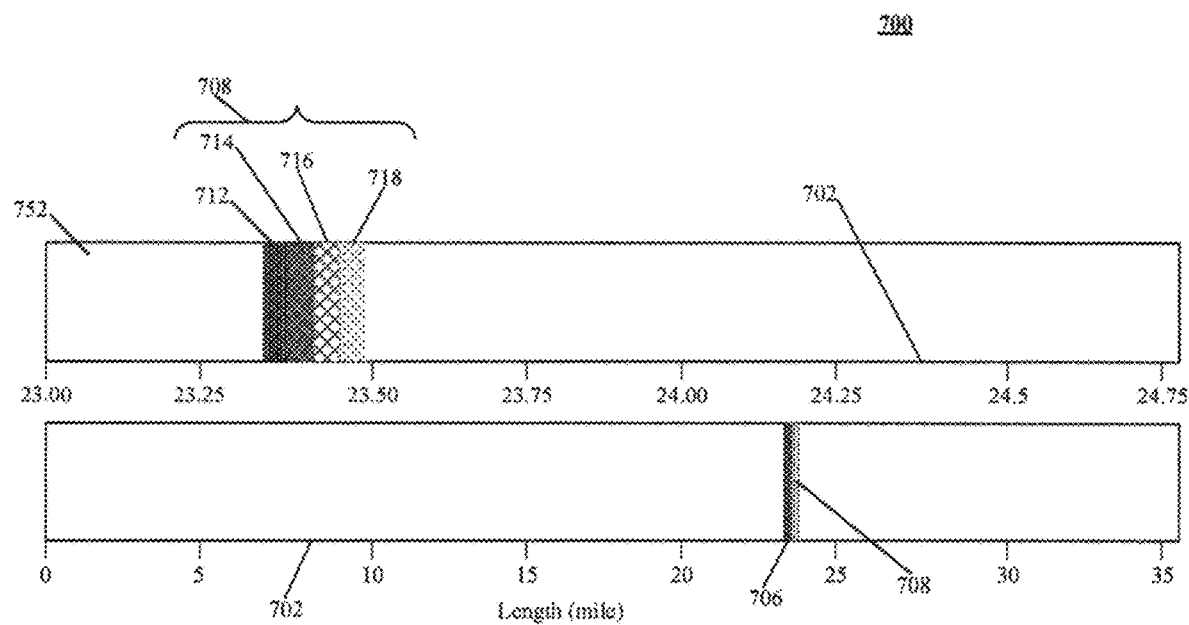
FIG. 7 is an illustrated diagram of a pipeline leak location indication system in accordance with this disclosure.

In one implementation, the leak indication is a visual display on a digital screen of the client computer system 142 as shown in FIG. 7. Referring to FIG. 7, an illustrative diagram of the leak indication is shown and generally indicated at 700. The length axis is indicated at 702. Length 0 indicates the beginning of a pipeline segment, such as the segment 106, while length 35 indicated the end of the segment 106. In such a case, the device 116 is located at length 0, while the device 118 is located at length 36.5. The actual leak (such as a simulated leak) occurs at roughly the 23.45 miles spot. The determined range or possible leak locations are indicated at 706. The range of possible leak locations is also graphically shown in a histogram at 708. To indicate the range of possible leak locations with added accuracy, an exploded view of the indicators 706-708 is shown at 752.

In the exploded view 752, the length axis 702 is shown in a more refined granularity. The histogram 708 are also shown with more refined granularity. Different subranges of possible leak locations are shown in different colors. The different subranges of the histogram are indicated at 712, 714, 716 and 718. In one implementation, lighter colors correspond to high probabilities of the leak location. For example, the value of the location 702 of a lighter color bar of the histogram indicates the actual leak location with a higher probability than that of a darker color bar of the histogram.

Equation A provides a convenient way to determine the location of the actual leak. However, the result is usually an unaccurate estimation due to many factors, such as signal noises, moisture level in the air, equipment quality, sensitivity of the monitoring devices, and other reasons. These factors lead to inaccurate values of timestamps $t_1$ and $t_2$. While the L parameter and v parameter of the Equation A can be accurately predetermined, the accuracy of the timestamps $t_1$ and $t_2$ determines the accuracy of the derived leak location $X_{leak}$.

Instead of focusing on pinpointing a specific location in conventional approaches, which leads to inaccurate results, the present disclosure determines a range of possible leak locations. It further determines a probability for each subrange within the range. In one implementation, in accordance with the present teachings, at 614 and 616, the server software application 314 performs regression analysis on the field data, including NPW data and timestamp data to accurately determine the timestamps $t_1$ and $t_2$.

The regression model below relates Y to a function of X and $\beta$:

$$\text{Regression Model } A: Y \approx f(X, \beta)$$

where dependent variable Y represents multiple time-varying signals (such as the pressure data), the dependent variable X represents the time, and $\beta$ represents a finite number of unknown parameters of the function $f$ that are estimated from the data. Specifically, the arrival-time of the NPW, is included in $\beta$.

Figure 12:
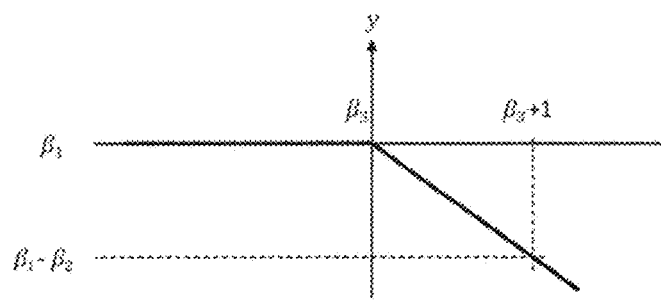
FIG. 12 is a diagram illustrating time-varying pressure signal in accordance with this disclosure.

To increase the precision of the leak localization determination, a plurality of forms of the function $f$ are predefined to estimate the values of the arrival-time $t_1$ and $t_2$. An illustrative a form of the function $f$, a.k.a. Ramp function, is shown below:

$$y(x) \approx \begin{cases} \beta_1, & x < \beta_3 \\ -\beta_2(x - \beta_3) + \beta_1, & x \geq \beta_3 \end{cases},$$

where y(x) represents the time-varying pressure signal, x represents time and $\beta=[\beta_1, \beta_2, \beta_3]$. Under the normal working condition, the pressure signal is close to the value of $\beta_1$. Due to a leak on a pipeline, an NPW originates at the leak point and propogates to the both ends. When the NPW arrives at the location of the monitoring device, e.g. 114, the pressure signal decreases at a rate of $-\beta_2$. The unknown parameter, $\beta_3$, of function $f$ represents the arrival-time of NPW. The time-varying pressure signal is further illustrated by the diagram shown in FIG. 12.

Figure 8:
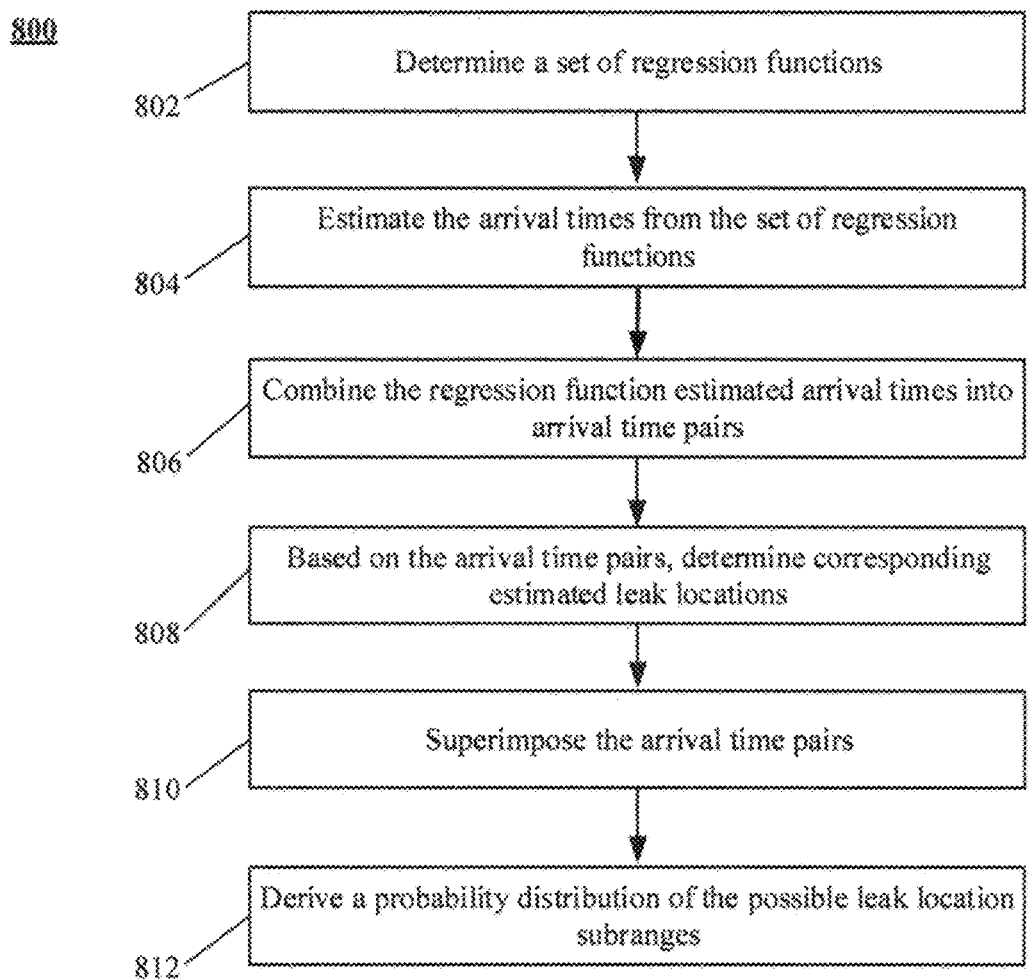
FIG. 8 is a flowchart illustrating the process by which a pipeline leak detection and location range determination system accurately estimates the negative pressure wave arrival time in accordance with this disclosure.

An illustrative regression analysis is shown in FIG. 8. Turning to FIG. 8, a flowchart illustrating a regression analysis process for accurately estimating the NPW arrival time is shown and generally indicated at 800. At 802, the server software application 314 determines a set of regression functions. At 804, the server software application 314 apply the set of functions to time-varying signals to drive a set of arrival times for the upstream NPW and a second set of arrival times for the downstream NPW. $(t_{1,1}, t_{1,2}, \ldots, t_{1,N})$ represents the set of regression function estimated arrival times of the upstream NPW. $(t_{2,1}, t_{2,2}, \ldots, t_{2,N})$ represents the set of regression function estimated arrival times of the downstream NPW. N stands for the number of functions within the set of regression functions.

At 806, the server software application 314 combines the two sets of regression function estimated arrival times into arrival time pairs:

$$(t_{1,1}, t_{2,1}), (t_{1,1}, t_{2,2}), (t_{1,1}, t_{2,3}), (t_{1,2}, t_{2,1}), \ldots, (t_{1,i}, t_{2,j}), \ldots, (t_{1,N}, t_{2,N})$$

At 808, the server software application 314 applies the Equation A to each of the pairs to determine an estimated leak location $X_{leak}$. The number of the estimated leak locations from the element 808 is N*N. At 810, the server software application 314 superimposes the set of estimated leak locations $X_{leak}$. At 812, the server software application 314 derives a probability distribution indicating the where the true leak may be located based on the superimposition. Each probability of the probability distribution corresponds to a subrange of possible locations where the leak actually occurred. The collection of the subranges forms the range of possible leak locations. The probability distribution can be, for example, visualized in a table or a histogram. An illustrative probability distribution table is shown in FIG. 10 and generally indicated at 1000. The table 1000 indicates that the most likely location of the leak ($X_{leak}$) is in the 23.37-23.41 (rounded to the hundredth) miles segment of the pipeline 102. In other words, the actual leak most likely occurred within the subrange 23.37-23.41 miles.

Figure 11:
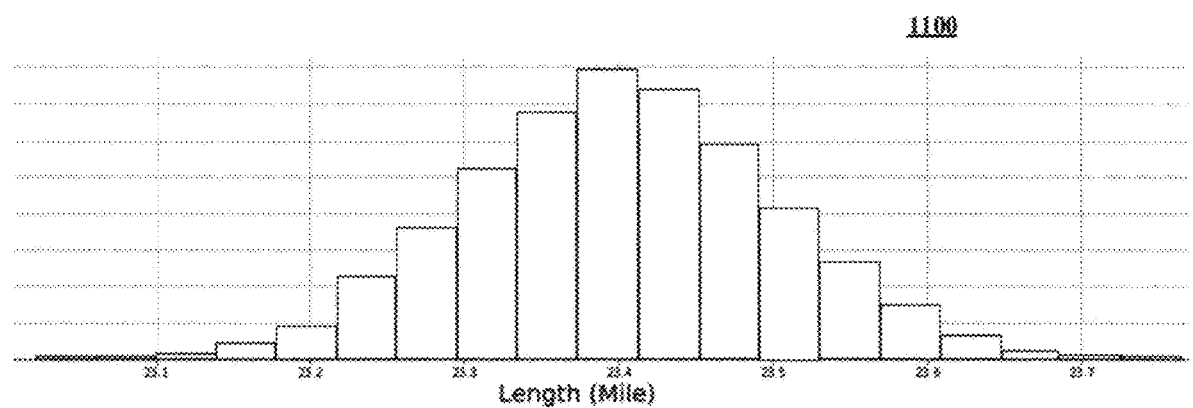
FIG. 11 is an illustrative probability distribution histogram in accordance with this disclosure.

The illustrative histogram of the possible leak location subranges is indicated at 708 in FIG. 7. In the illustration, the range of possible leak locations less than four percent (4%) of the length of the segment 106. The histogram of the probability distribution table 1000 is further illustrated in FIG. 11 and generally indicated at 1100.

A higher probability indicates that the corresponding subranges of possible leak locations is more likely to encompass the actual leak location. The probability distribution allows a pipeline maintenance crew to seek out the actual leak location by focusing on the subrange of possible leak locations with the highest probability of leak first. If the leak is not within the subrange of the highest probability, the crew then examine the subrange of possible leak locations with the second highest probability of leak to identify the actual leak. Examining subranges of possible leak locations in the order of the corresponding probabilities from the highest to the lowest provides a most efficient and faster method to locate the actual leak location.

Figure 9:
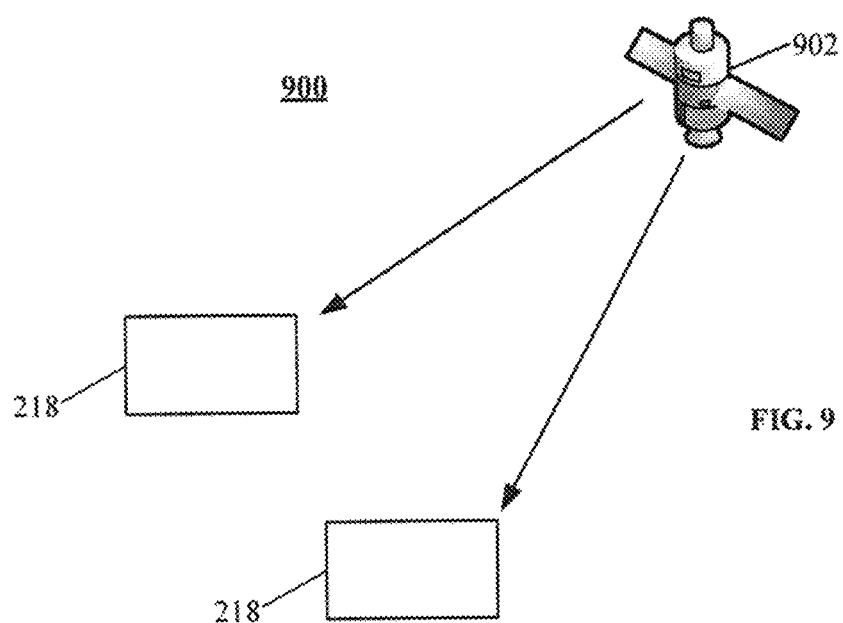
FIG. 9 is an illustrative block diagram of a timing system in accordance with this disclosure.

Referring now to FIG. 9, an illustrative block diagram of a timing system is shown and generally indicated at 900. The timing receivers 218 of the monitoring devices 114-124 receive timing data from a timing source, such as a Global Navigation Satellite Systems ("GNSS"). The GNSS can be, for example, a Global Positioning System ("GPS") system. In one implementation, each monitoring device 114-124 runs a Stratum 1 Network Time Protocol ("NTP") server. By using the timing receivers 218, the Stratum 1 NTP servers synchronize the system time of the corresponding monitoring devices. The time synchronization system 900 is critical to provide accurate timestamps by the monitoring devices 114-124. The accurate timestamps allow the accurate localization of a leak in the pipeline 102.

Obviously, many additional modifications and variations of the present disclosure are possible in light of the above teachings. Thus, it is to be understood that, within the scope of the appended claims, the disclosure may be practiced otherwise than is specifically described above. For example, the server software application 314 can be written in the computer programming languages C++, Java, etc.

The foregoing description of the disclosure has been presented for purposes of illustration and description, and is not intended to be exhaustive or to limit the disclosure to the precise form disclosed. The description was selected to best explain the principles of the present teachings and practical application of these principles to enable others skilled in the art to best utilize the disclosure in various embodiments and various modifications as are suited to the particular use contemplated. It should be recognized that the words "a" or "an" are intended to include both the singular and the plural. Conversely, any reference to plural elements shall, where appropriate, include the singular.

It is intended that the scope of the disclosure not be limited by the specification, but be defined by the claims set forth below. In addition, although narrow claims may be presented below, it should be recognized that the scope of this invention is much broader than presented by the claim(s). It is intended that broader claims will be submitted in one or more applications that claim the benefit of priority from this application. Insofar as the description above and the accompanying drawings disclose additional subject matter that is not within the scope of the claim or claims below, the additional inventions are not dedicated to the public and the right to file one or more applications to claim such additional inventions is reserved.

What is claimed is:

1. A method of determining a pipeline leak and the leak location range; said method performed within a server computer system and comprising:
   1) receiving a first set of field data points from a first monitoring device within a set of monitoring devices, each field data point within said first set of field data points including a timestamp and a corresponding time-varying signal, wherein said time-varying signal is a value of a parameter, said server computer system including a server computer processing unit, some amount of memory operatively coupled to said server computer processing unit, a server software application, and a networking interface operatively coupled to said server computer processing unit for receiving field data from said set of monitoring devices, each monitoring device within said set of monitoring devices installed at a joint between two consecutive pipeline segments of a pipeline, said pipeline having a set of pipeline segments, each monitoring device within said set of monitoring device including:
      a) a microprocessor;
      b) a set of sensors operatively coupled to said microprocessor, each sensor within said set of sensors adapted to detect values of said parameter of a flowing material within said pipeline;
      c) a wireless network interface operatively coupled to said microprocessor for communicating with said server computer system;
      d) some amount of memory operatively coupled to said microprocessor; and
      e) a time receiver operatively coupled to said microprocessor;
   2) receiving a second set of field data points from a second monitoring device within said set of monitoring devices, each field data point within said second set of field data points includes a timestamp and a corresponding time-varying signal;
   3) analyzing said first set of field data points and said second set of field data points to determine that a leak has occurred to a first pipeline segment corresponding to said first monitoring device and said second monitoring device; and
   4) determining a probability distribution corresponding to a set of subranges of a range of possible leak locations.

2. The method of claim 1 further comprising:
   1) determining a set of regression functions;
   2) estimating a first set of arrival times from said set of regression functions by applying said set of regression functions to said first set of field data points;
   3) estimating a second set of arrival times from said set of regression functions by applying said set of regression functions to said second set of field data points;
   4) combining said first set of arrival times and said second set of arrival times to form a set of arrival time pairs;
   5) applying a leak location determination equation to each arrival time pair within said set of arrival time pairs to derive an estimated leak location, thereby forming a set of estimated leak locations; and
   6) superimposing said set of estimated leak locations to derive said probability distribution corresponding to said set of subranges of possible leak locations.

3. The method of claim 2 wherein said parameter is a pressure parameter, a temperature parameter or a velocity parameter.

4. The method of claim 3 wherein said pressure parameter is a negative pressure wave parameter.

5. The method of claim 3 wherein said leak location determination equation is an equation of:

$$X_{leak} = (L + v^*(t_2 - t_1))/2$$

where $X_{leak}$ refers to a leak location, L stands for the full length of a segment within said set of pipeline segments, v stands for the sound velocity, $t_2$ refers to the timestamp when the negative pressure wave of a leak is detected by said second monitoring device, and t1 refers to the timestamp when the negative pressure wave of said leak was detected by said first monitoring device.

6. The method of claim 5 wherein said server software application performs a regression analysis to derive said probability distribution using a regression model:

$$Y \approx f(X, \beta)$$

where Y represents multiple time-varying signals, X represents timestamps of time-varying signals, and $\beta$ represents a finite number of unknown parameters of the regression function $f$ that are estimated from data points.

7. The method of claim 6 wherein said set of regression functions are Ramp functions:

$$y(x) \approx \begin{cases} \beta_1, & x < \beta_3 \\ -\beta_2(x - \beta_3) + \beta_1, & x \geq \beta_3 \end{cases}$$

where y(x) represents time-varying pressure signals, x represents timestamps and $\beta=[\beta_1, \beta_2, \beta_3]$, $\beta_1$ represents time-varying pressure signal without a leak, $\beta_2$ represents the time-varying pressure signal decreasing rate when a leak occurs, $\beta_3$ represents the arrival-time of the negative pressure wave when a leak occurs.

\* \* \* \* \*